United States Patent
Qiao et al.

(10) Patent No.: US 10,338,982 B2
(45) Date of Patent: Jul. 2, 2019

(54) HYBRID AND HIERARCHICAL OUTLIER DETECTION SYSTEM AND METHOD FOR LARGE SCALE DATA PROTECTION

(71) Applicant: International Business Machines Corporation, Armonk, NY (US)

(72) Inventors: Mu Qiao, Belmont, CA (US); Ramani R. Routray, San Jose, CA (US); Quan Zhang, Detroit, MI (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 15/397,627

(22) Filed: Jan. 3, 2017

(65) Prior Publication Data

US 2018/0189128 A1 Jul. 5, 2018

(51) Int. Cl.
*G06F 11/00* (2006.01)
*G06F 11/07* (2006.01)
(Continued)

(52) U.S. Cl.
CPC ...... *G06F 11/0751* (2013.01); *G06F 11/0727* (2013.01); *G06F 11/1448* (2013.01);
(Continued)

(58) Field of Classification Search
CPC ............ G06F 11/0727; G06F 11/0751; G06F 11/1448; G06F 11/004; G06F 11/008;
(Continued)

(56) References Cited

U.S. PATENT DOCUMENTS 7,191,096 B1 * 3/2007 Gross .................... G06F 11/008
702/179
7,830,382 B2 11/2010 Cirit et al.
(Continued)

OTHER PUBLICATIONS

Fernandez, M.A. et al., "A Control Chart Based on Cluster-Regression Adjustment for Retrospective Monitoring of Individual Characteristics", PLoS One, Apr. 29, 2015, pp. 1-19, IP.com, United States.
(Continued)

*Primary Examiner* — Anthony J Amoroso
(74) *Attorney, Agent, or Firm* — Sherman IP LLP; Kenneth L. Sherman; Hemavathy Perumal

(57) ABSTRACT

One embodiment provides a method comprising receiving metadata comprising univariate time series data for each variable of a multivariate time series. The method comprises, for each variable of the multivariate time series, applying a hybrid and hierarchical model selection process to select an anomaly detection model suitable for the variable based on corresponding univariate time series data for the variable and covariations and interactions between the variable and at least one other variable of the multivariate time series, and detecting an anomaly on the variable utilizing the anomaly detection model selected for the variable. Based on each anomaly detection model selected for each variable of the multivariate time series, the method further comprises performing ensemble learning to determine whether the multivariate time series is anomalous at a particular time point.

18 Claims, 5 Drawing Sheets

(51) Int. Cl.
*G06F 11/14* (2006.01)
*G06F 17/18* (2006.01)
*G06F 17/10* (2006.01)
*G06N 7/00* (2006.01)
*G06N 3/00* (2006.01)
*G06K 9/00* (2006.01)
*G06K 9/62* (2006.01)

(52) U.S. Cl.
CPC .......... *G06F 11/1458* (2013.01); *G06F 17/10* (2013.01); *G06F 17/18* (2013.01); *G06K 9/0053* (2013.01); *G06K 9/0055* (2013.01); *G06K 9/6247* (2013.01); *G06K 9/6284* (2013.01); *G06K 9/6292* (2013.01); *G06N 3/00* (2013.01); *G06N 7/00* (2013.01); *G06F 2212/1032* (2013.01)

(58) Field of Classification Search
CPC .. G06F 11/22; G06F 11/2257; G06F 11/2263; G06F 11/3447; G06F 11/3452; G06F 17/10; G06F 17/18; G06F 2212/1032; G06F 11/1458; G06K 9/0053; G06K 9/0055; G06K 9/6247; G06K 9/6284; G06K 9/6292; G06K 9/00523; G06K 9/00563; G06K 9/6232; G06K 9/6288; G06N 3/00; G06N 7/00; G06N 7/02
See application file for complete search history.

(56) References Cited

U.S. PATENT DOCUMENTS

| | | | |
|---|---|---|---|
| 8,918,285 B1 | 12/2014 | Nelson et al. | |
| 9,984,334 B2* | 5/2018 | Nikovski | G06N 20/00 |
| 2012/0123981 A1 | 5/2012 | Graves et al. | |
| 2013/0046721 A1* | 2/2013 | Jiang | G01W 1/10 706/47 |
| 2014/0200952 A1* | 7/2014 | Hampapur | B61K 9/08 705/7.28 |
| 2015/0205690 A1* | 7/2015 | Seto | G06F 11/008 702/182 |
| 2015/0205691 A1* | 7/2015 | Seto | G06F 11/008 702/182 |
| 2015/0205692 A1* | 7/2015 | Seto | G06F 11/3452 702/182 |
| 2015/0205693 A1* | 7/2015 | Seto | G06F 11/3065 702/186 |
| 2015/0310166 A1 | 10/2015 | Gronemeyer et al. | |
| 2016/0092501 A1 | 3/2016 | Chakraborty et al. | |
| 2016/0098037 A1 | 4/2016 | Zornio et al. | |
| 2016/0299938 A1* | 10/2016 | Malhotra | G06F 17/18 |
| 2016/0352767 A1* | 12/2016 | Owhadi | G06F 17/18 |

OTHER PUBLICATIONS

Cleveland, R.B. et al., "STL: A Seasonal-Trend Decomposition Procedure Based on Loess", Journal of Official Statistics, Jan. 1990, pp. 3-33, vol. 6, No. 1; Statistics Sweden, Germany.

De Leeuw, J., "Information Theory and An Extension of the Maximum Likelihood Principle by Hirotogu Akaike", University of California, Los Angeles, Mar. 1994, pp. 1-12, ResearchGate, United States.

List of IBM Patents or Patent Applications Treated as Related; Qiao, M. et al., filed Mar. 26, 2019, U.S. Appl. No. 16/365,471.

* cited by examiner

| Attributes | BACKUP_ID | SERVER_ID | CLIENT_ID | TARGET | TYPE | JobTimeUsed | ByteCount | ErrorCount | FileCount | JobDuration |
|---|---|---|---|---|---|---|---|---|---|---|
| Values | 201399774 | 6221 | 1343910 | /path/to/backup/location | Incremental | 2016-01-01 16:26:18.01 | 3,884,910 | 0 | 17799 | 1395 |

HYBRID AND HIERARCHICAL OUTLIER DETECTION SYSTEM AND METHOD FOR LARGE SCALE DATA PROTECTION

The present invention generally relates to data protection, and more particularly, to a hybrid and hierarchical outlier detection system and method for large scale data protection.

BACKGROUND

Data protection is a process of backing up data to protect against a data loss event. Data protection is one of the most critical routine activities for an organization. Detecting abnormalities in a data backup job is important to prevent data protection failures and ensure/maintain service quality.

SUMMARY

One embodiment provides a method comprising receiving metadata comprising univariate time series data for each variable of a multivariate time series. The method comprises, for each variable of the multivariate time series, applying a hybrid and hierarchical model selection process to select an anomaly detection model suitable for the variable based on corresponding univariate time series data for the variable and covariations and interactions between the variable and at least one other variable of the multivariate time series, and detecting an anomaly on the variable utilizing the anomaly detection model selected for the variable. Based on each anomaly detection model selected for each variable of the multivariate time series, the method further comprises performing ensemble learning to determine whether the multivariate time series is anomalous at a particular time point.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates an example metadata record associated with a data backup job, in accordance with an embodiment of the invention.

Figure 1:
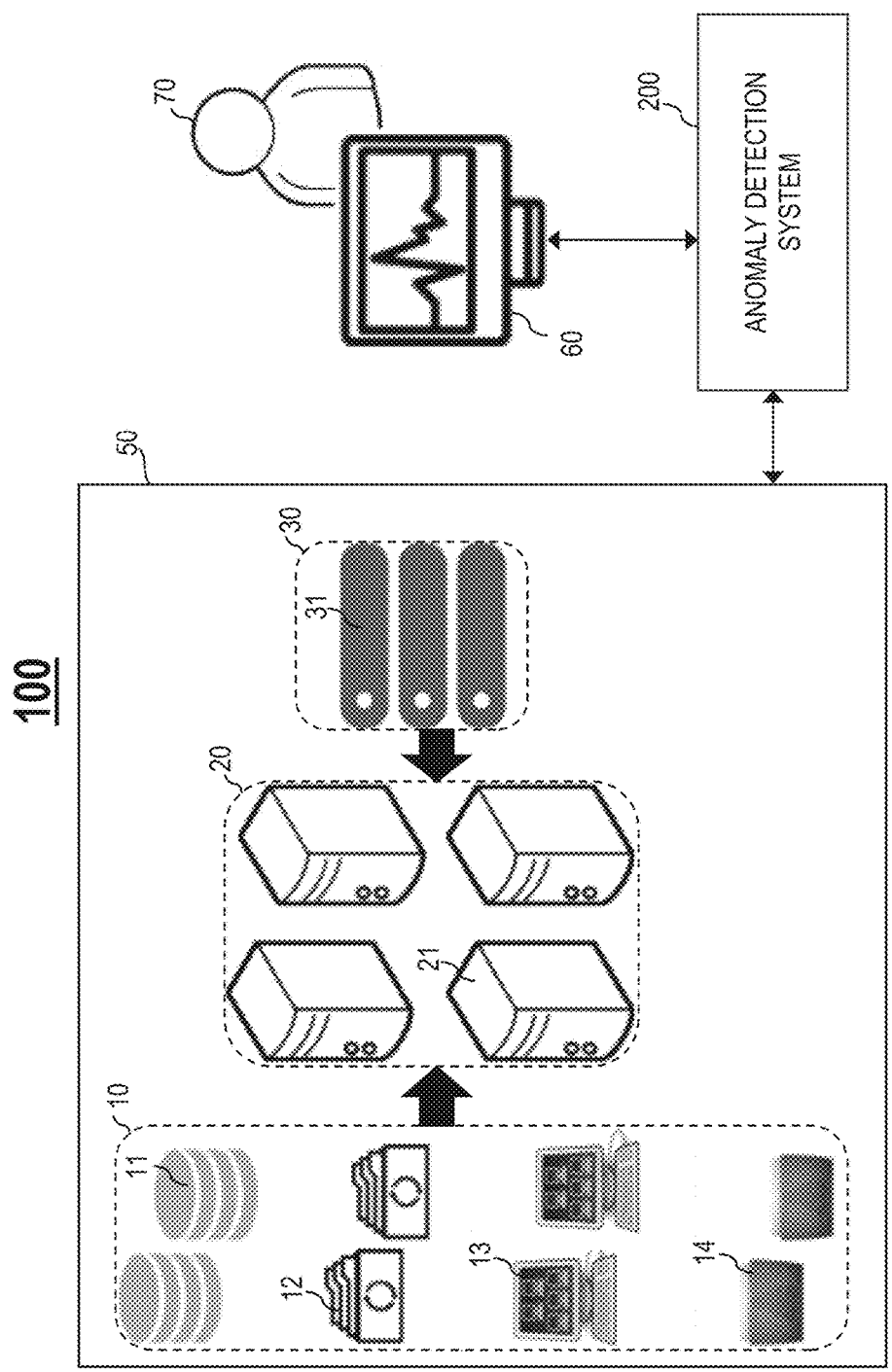
FIG. 1 illustrates an example computer framework for anomaly detection for large scale data protection, in accordance with an embodiment of the invention.

The detailed description explains the preferred embodiments of the invention, together with advantages and features, by way of example with reference to the drawings.

DETAILED DESCRIPTION

The present invention generally relates to data protection, and more particularly, to a hybrid and hierarchical outlier detection system and method for large scale data protection. One embodiment provides a method comprising receiving metadata comprising univariate time series data for each variable of a multivariate time series. The method comprises, for each variable of the multivariate time series, applying a hybrid and hierarchical model selection process to select an anomaly detection model suitable for the variable based on corresponding univariate time series data for the variable and covariations and interactions between the variable and at least one other variable of the multivariate time series, and detecting an anomaly on the variable utilizing the anomaly detection model selected for the variable. Based on each anomaly detection model selected for each variable of the multivariate time series, the method further comprises performing ensemble learning to determine whether the multivariate time series is anomalous at a particular time point.

For expository purposes, the terms "anomaly" and "outlier" as used in this specification generally refer to an item, an event, or an observation that does not conform to an expected pattern or other items in a dataset. The terms "anomaly" and "outlier" are used interchangeably in this specification. The terms "anomaly detection" and "outlier detection" as used in this specification generally refer to a process of detecting/identifying an anomaly in a dataset.

For expository purposes, the terms "multivariate time series" and "multidimensional time series" as used in this specification generally refer to a time series or data stream that comprises multiple metrics for multiple variables.

A service provider that provides large scale data protection/data backup as a service may manage a large number of backup endpoints and a variety of data backup jobs. For example, the service provider may manage more than 700,000 backup endpoints and over three million daily data backup jobs on 5000 backup servers. The service provider may need a scalable and flexible outlier detection method that can model a large number of objects and capture its diverse patterns.

Conventional techniques for detecting anomalies in a multivariate time series utilize a single type of outlier detection model to detect anomalies across multiple metrics in a unified fashion. Multiple variables in the time series, however, may exhibit different characteristics over time. For example, while some variables show strong seasonality, others variables may not exhibit such temporal patterns. There are different possible outlier detection models available for different variables in the time series; the models have different performance costs on different types of data. Therefore, as there are is no existing model that fit all the variables, utilizing a single type of model is not appropriate.

FIG. 1 illustrates an example computer framework 100 for anomaly detection for large scale data protection, in accordance with an embodiment of the invention. The computer framework 100 comprises a data backup operational environment 50 managed by a service provider that provides large scale data protection as a service. The data backup operational environment 50 comprises a storage system 30, a set 20 of server devices 21, and a collection 10 of backup end points. The storage system 30 may comprise a single persistent storage device 31 or a distribution of persistent storage devices 31.

The data backup operational environment 50 manages a large number of different backup endpoints and performs a variety of data backup jobs. In one embodiment, the collection 10 includes backup end points, such as, but not limited to, one or more databases 11, one or more document archives 12, one or more virtual machines 13, and one or more systems 14. The server devices 21 maintains data backups resulting from data backup jobs performed on at least one backup end point of the collection 10 and/or at least one storage device 31.

The computer framework 100 further comprises an anomaly detection system 200 configured to: (1) receive, from the data backup operational environment 50, metadata associated with at least one data backup job performed by the data backup operational environment 50, (2) based on the metadata received, apply a hybrid and hierarchical method to detect anomalies from a large scale multivariate time series, and (3) provide, to a backup monitoring system 60 monitored by one or more service administrators 70, data indicative of anomalies detected, if any.

In one embodiment, the anomaly detection system 200 exchanges data with the data backup operational environment 500 and the backup monitoring system 60 over one or more connections (e.g., a wireless connection, a wired connection, or a combination of the two).

Figure 2:
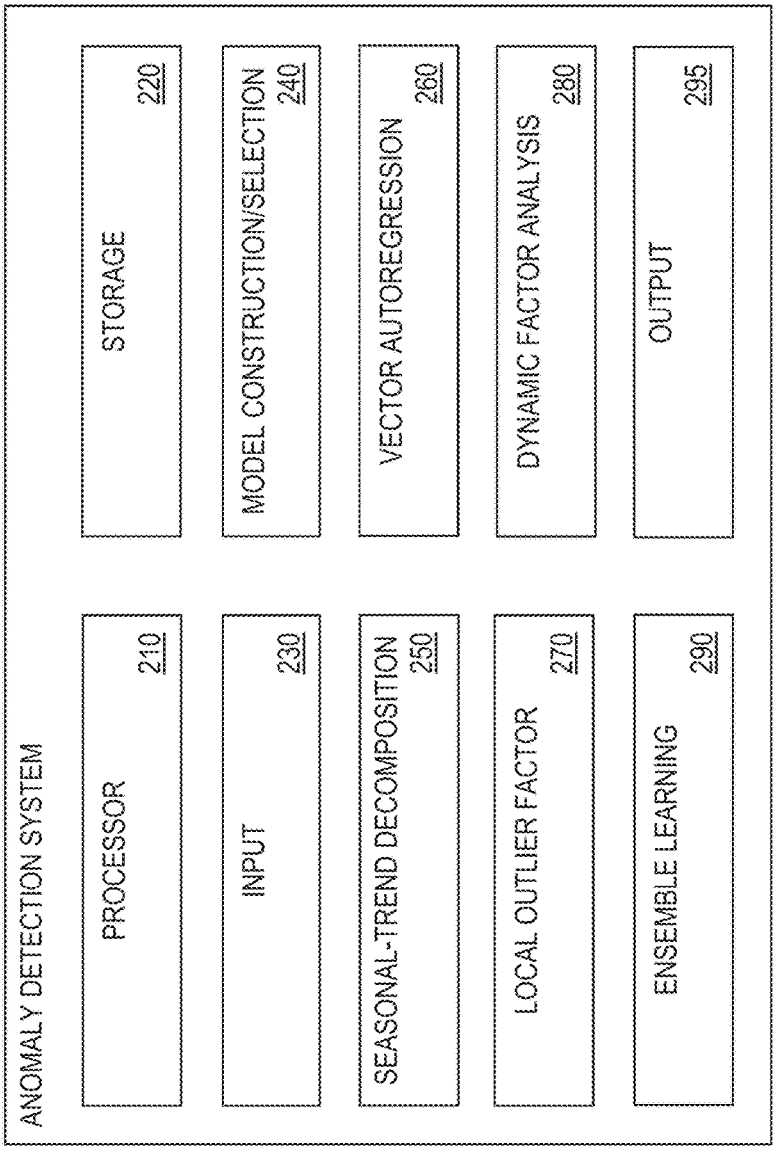
FIG. 2 illustrates an example anomaly detection system in detail, in accordance with an embodiment of the invention.

FIG. 2 illustrates an example anomaly detection system 200 in detail, in accordance with an embodiment of the invention. The anomaly detection system 200 comprises computation resources, such as, but not limited to, one or more processor devices 210 and one or more storage devices 220. One or more applications may execute/operate on the processor devices 210 to provide anomaly detection for large scale data protection. In one embodiment, the applications comprise, but are not limited to, the following: (1) an input unit 230, (2) a model construction/selection unit 240, (3) a seasonal-trend decomposition unit 250, (4) a vector autoregression (VAR) unit 260, (5) a local outlier factor (LOF) unit 270, (6) a dynamic factor analysis (DFA) unit 280, (7) an ensemble learning unit 290, and (8) an output unit 295.

In one embodiment, the input unit 230 is configured to receive metadata associated with one or more data backup jobs. For example, the input unit 230 may receive, from a data backup operational environment 50, metadata associated with one or more data backup jobs performed by a service provider. The metadata received comprises univariate time series data for each variable of a multivariate time series.

Let $y_t$ denote a multivariate time series at a particular time point t comprising K different variables, wherein $y_t = (y_{1t}, y_{2t}, \ldots, y_{Kt})'$, $y_{it}$ denotes a variable of the time series $y_t$, and $1 \leq i \leq K$. Let Y denote an entire multivariate time series for a plurality of different time points, wherein $Y = (y_1, y_2, \ldots, y_T)$, and T denotes a total number of time points. Let $Y_v$ denote a $v^{th}$ multivariate time series, wherein $v=1, \ldots, N$, and N denotes a total number of time series.

In one embodiment, the model construction/selection unit 240 decomposes a time series $Y_v$ into the following three components: (1) a trend component $T_v$ indicating a long term non-stationary data change, (2) a seasonal component $S_v$ indicating whether the time series is influenced by seasonal factors or a fixed and known period, and (3) a remainder component $R_v$ indicating a component in the time series $Y_v$ after the trend component $T_v$ and the seasonal component $S_v$ are removed. The time series $Y_v$ may be represented in accordance with equation (1) provided below:

$$Y_v = T_v + S_v + R_v \quad (1).$$

The model construction/selection unit 240 is configured to apply a hybrid and hierarchical model selection process. The model selection process applied is hybrid as the model construction/selection unit 240 selects different anomaly detection methods/models for different variables of a multivariate time series. The model selection process applied is hierarchical as the model construction/selection unit 240 follows a global to local fashion that starts with determining which variables of the time series exhibit the strongest patterns (i.e., seasonality or periodicity).

In one embodiment, the model construction/selection unit 240 selects, for each variable of a multivariate time series, an anomaly detection method/model for the variable from one of the following categories: (1) seasonal-trend decomposition based anomaly detection, (2) VAR based anomaly detection, or (3) distance based anomaly detection.

In one embodiment, the model construction/selection unit 240 groups/classifies each variable of a multivariate time series into one of the following groups: (1) a first group of variables exhibiting siginificant seasonality or periodicity ("first variable set"), and (2) a second group of variables that do not exhibit siginificant seasonality or periodicity ("second variable set"). Specifically, for each variable of the multivariate time series, the model construction/selection unit 240 determines whether corresponding univariate time series data for the variable exhibits significant seasonality or periodicity.

In one embodiment, the model construction/selection unit 240 applies spectral analysis to determine whether corresponding univariate time series data for a variable exhibits significant seasonality or periodicity. After removing a linear trend from the univariate time series data, the model construction/selection unit 240 estimates a spectral density function of the variable from a best fitting autoregression method/model using Akaike information criterion (AIC). A detailed description of AIC is available in the publication titled "Information theory and an extension of the maximum likelihood principle" by H. Akaike, published in *Selected Papers of Hirotugu Akaike,* 1998. If a large maximum in present in the estimated spectral density function at frequency $f$, a seasonality or periodicity of the variable is defined as the value of $1/f$ rounded to the nearest integer.

If corresponding univariate time series data for a variable exhibits significant seasonality or periodicity, the model construction/selection unit 240 groups/classifies the variable into the first variable set. The model construction/selection unit 240 selects a seasonal-trend decomposition based anomaly detection method/model to detect anomalies/outliers for the first variable set.

If corresponding univariate time series data for a variable does not exhibit significant seasonality or periodicity, the model construction/selection unit 240 groups/classifies the variable into the second variable set. The model construction/selection unit 240 selects a VAR based anomaly detection method/model to model the second variable set. As described in detail later herein, the model construction/selection unit 240 applies a goodness-of-fit test for each variable of the second variable set to determine whether a VAR based anomaly detection method/model selected fits the multivariate time series very well. If a VAR based anomaly detection method/model selected fits the multivariate time series very well, the model construction/selection unit 240 selects a VAR based anomaly detection method/ model to detect anomalies/outliers for second variable set. If a VAR based anomaly detection method/model selected does not fit the multivariate time series very well, the model construction/selection unit 240 selects a distance based anomaly detection method/model to detect anomalies/outliers for the second variable set.

The seasonal-trend decomposition unit 250 applies a seasonal-trend decomposition based anomaly detection method/model to detect anomalies/outliers for each variable of the first variable set. Trend estimation is an important factor in seasonal-trend decomposition. A sudden change in a time series is graduated over many time periods. Trend estimation may be easily affected by such spikes in training data, thereby introducing artificial anomalies that result in false positives in anomaly detection.

The DFA unit 280 is configured to apply DFA to estimate common trends among multiple variables. DFA is a dimension reduction technique that reduces a multivariate time series with K variables to M common trends. DFA considers common changes among the K variables to estimate M common trends that are indicative of covariations and interactions among the K variables. The M common trends are more robust to the presence of anomalies/outliers in training data and less distorted by sudden changes in a time series, thereby significantly reducing the number of false positives in anomaly detection.

In one embodiment, a dynamic factor model with M common trends is represented in accordance with equations (2.1)-(2.2) provided below:

$$x_t = x_{t-1} + w_t \quad (2.1),$$

and $$y_t = Zx_t + a + v_t \quad (2.2),$$

wherein $w_t$ and $v_t$ are error components at time point t, $w_t$ follows a multivariate normal distribution (MVN) with covariance matrix Q (i.e., $w_t \sim MVN(0,Q)$), $v_t$ follows a MVN with covariance matrix R (i.e., $v_t \sim MVN(0, R)$), $x_0$ is a common trend at initial time point $t_0$, $x_0$ follows a MVN with mean $\pi$ and covariance matrix $\Lambda$ (i.e., $x_0 \sim MVN(\pi, \Lambda)$), Z is a matrix of factor loadings having dimensions N×M, $x_t$ is a vector comprising M common trends at time point t, and a are offsets. Each variable y is modeled as a linear combination of a common trend x and the matrix of factor loadings Z plus offsets a. In one embodiment, an expectation-maximization (EM) algorithm may be applied to estimate these parameters.

A total number of common trends may be determined using a model selection technique, such as AIC. After a common trend x is estimated, the common trend x is multiplied by the matrix of factor loadings Z to obtain a final trend for each individual variable.

In one embodiment, if the first variable set comprises multiple variables, the seasonal-trend decomposition based anomaly detection method/model applied by the seasonal-trend decomposition unit 250 is a combination of STL and DFA. A detailed description of STL is available in the publication titled "STL: A seasonal-trend decomposition procedure based on loess" by R. B. Cleveland et al., published in *Journal of Official Statistics,* 1990. After obtaining common trends among the first variable set from the DFA unit 280, the seasonal-trend decomposition unit 250 applies STL to extract a seasonal component of each variable of the first variable set. If the first variable set compries only one variable, the seasonal-trend decomposition based anomaly detection method/model applied by the seasonal-trend decomposition unit 250 is only STL.

In another embodiment, another seasonal-trend decomposition based anomaly detection method/model is applied by the seasonal-trend decomposition unit 250 instead.

The seasonal-trend decomposition unit 250 obtains a remainder component of each variable of the first variable set by subtracting/removing a seasonal component and a trend component of the variable from corresponding univariate time series data for the variable. For each variable of the first variable set, the seasonal-trend decomposition unit 250 determines whether a data point is an anomaly/outlier on the variable based on a remainder component of the variable. Specifically, the seasonal-trend decomposition unit 250 identifies the data point as an anomaly/outlier on the variable if an absolute value of a remainder component of the data point is significantly larger than absolute values of other remainder components of other data points.

A variable may be represented as a linear function of past lags of the variable and lags of one or more other variables. Let VAR(p) denote a VAR based anomaly detection method/model of lag p. In one embodiment, VAR(p) may be represented in accordance with equation (3) provided below:

$$y_t = A_1 y_{t-1} + \ldots + A_p y_{t-p} + u_t \quad (3),$$

wherein i=1, . . . , p, $A_i$ is a coefficient matrix, and $u_t$ is an error term. The model construction/selection unit 240 applies a model selection method to select an optimal value of p, such as AIC.

For each variable of the second variable set, the model construction/selection unit 240 applies a goodness-of-fit test to determine a goodness-of-fit value $R^2$ for the variable. If an average value of all goodness-of-fit values $R^2$ determined meets or exceeds a pre-determined threshold value, the model construction/selection unit 240 concludes that a VAR based anomaly detection method/model selected for the second variable set fits the multivariate time series very well. If an average value of all goodness-of-fit values $R^2$ determined is less than a pre-determined threshold value (i.e., a low goodness-of-fit value), the model construction/selection unit 240 concludes that a VAR based anomaly detection method/model selected for the second variable set does not fit the multivariate time series very well as the second variable set does not exhibit strong global temporal patterns.

As stated above, if the model construction/selection unit 240 concludes that a VAR based anomaly detection method/model fits the multivariate time series very well, the model construction/selection unit 240 selects a VAR based anomaly detection method/model to detect anomalies/outliers for the second variable set. Specifically, if the second variable set comprises only one variable, the model construction/selection unit 240 selects the autoregressive model (AR) to detect anomalies/outliers for the variable. If the second variable set comprises multiple variables, the model construction/selection unit 240 selects VAR to detect anomalies/outliers for each variable of the second variable set.

In one embodiment, the VAR unit 260 identifies a data point as an anomaly/outlier on a variable based on a comparison of an estimated value of the data point in a time series $y_t$ at time point t with a real observed value of the data point at time point t. If an absolute difference of the estimated value and the real observed value exceeds a pre-determined threshold, the VAR unit 260 identifies the data point as an anomaly/outlier on the variable.

As stated above, if the model construction/selection unit 240 concludes that a VAR based anomaly detection method/ model does not fit the multivariate time series very well, the model construction/selection unit 240 selects a distance based anomaly detection method/model to detect anomalies/outliers for the second variable set. In one embodiment, for all variables of the second variable set, the model construction/selection unit 240 selects LOF to detect anomalies/outliers locally.

Based on the number of variables included in the second variable set, LOF computes distance using either multiple dimensions or a single dimension. LOF focuses on local patterns by measuring deviation of a data point with respect to a local reachability density of the data point (i.e., density in a neighborhood comprising k nearest neighbors). A local reachability density of a data point provides an estimate of a degree of abnormality of the data point. A local reachability density of a data point is an inverse of an average reachability distance of k nearest neighbors of the data point. An outlier factor of a data point is an average of ratios between a local reachability density of the data point and its k nearest neighbors. For variables in the second variable set, the LOF unit 270 identifies a data point as an anomaly/outlier on all the variables if an outlier factor of the data point is higher than outlier factors of its k nearest neighbors. In another embodiment, instead of applying LOF to all variables of the second variable set together, LOF is applied to each variable of the second variable set individually/separately. Specifically, for each variable of the second variable set, the model construction/selection unit 240 selects LOF to detect anomalies/outliers locally on that variable.

In summary, the anomaly detection system 200 selects, for each variable of a multivariate time series, an anomaly detection method/model suited for the variable based on characteristics exhibited by corresponding univariate time series data for the variable and its covariations and interactions with other variables. The anomaly detection system 200 applies a seasonality-trend decomposition based anomaly detection method/model (e.g., STL only or a combination of STL and DFA) to detect anomalies/outliers for each variable of the multivariate time series that exhibits seasonality or periodicity. The anomaly detection system 200 determines whether a VAR based anomaly detection method/model fits the multivariate time series very well by applying a goodness-of-fit test for each variable of the multivariate time series that does not exhibit significant seasonality or periodicity. If a VAR based anomaly detection method/model fits the multivariate time series very well, the anomaly detection system 200 applies a VAR based anomaly detection method/model (e.g., AR or VAR) to detect anomalies/outliers for each variable of the multivariate time series that does not exhibit significant seasonality or periodicity. If a VAR based anomaly detection method/model does not fit the multivariate time series very well, the anomaly detection system 200 applies a distance based anomaly detection method/model (e.g., LOF) to detect anomalies/outliers for variables of the multivariate time series that does not exhibit significant seasonality or periodicity. With the exception of LOF, all anomaly detection methods/models described above detect anomalies/outliers on a variable individually although covariation and interactions among multiple variables have been factored in.

The ensemble learning unit 290 performs ensemble learning based on each anomaly detection method/model selected for each variable of the multivariate time series to determine whether the multivariate time series at a certain time point t is anomalous. In one embodiment, the ensemble learning unit 290 applies a majority vote scheme to determine whether the multivariate time series at a certain time point t is anomalous, wherein each variable of the multivariate time series has one vote in the ensemble learning. As LOF may be applied to multiple variables using full dimensional distance, the ensemble learning unit 290 will take up to k votes in the final voting if there are k variables in LOF. In another embodiment, the user may define another business logic in the ensemble learning. For example, a multivariate time series at a particular time point t is anomalous only if it is anomalous on certain variables, but not on others.

The output unit 295 is configured to output data indicative of whether the multivariate time series at a particular time point t is anomalous. For example, the output unit 295 may provide to a backup monitoring system 60 a report indicative of anomalies detected, if any.

Figure 3:
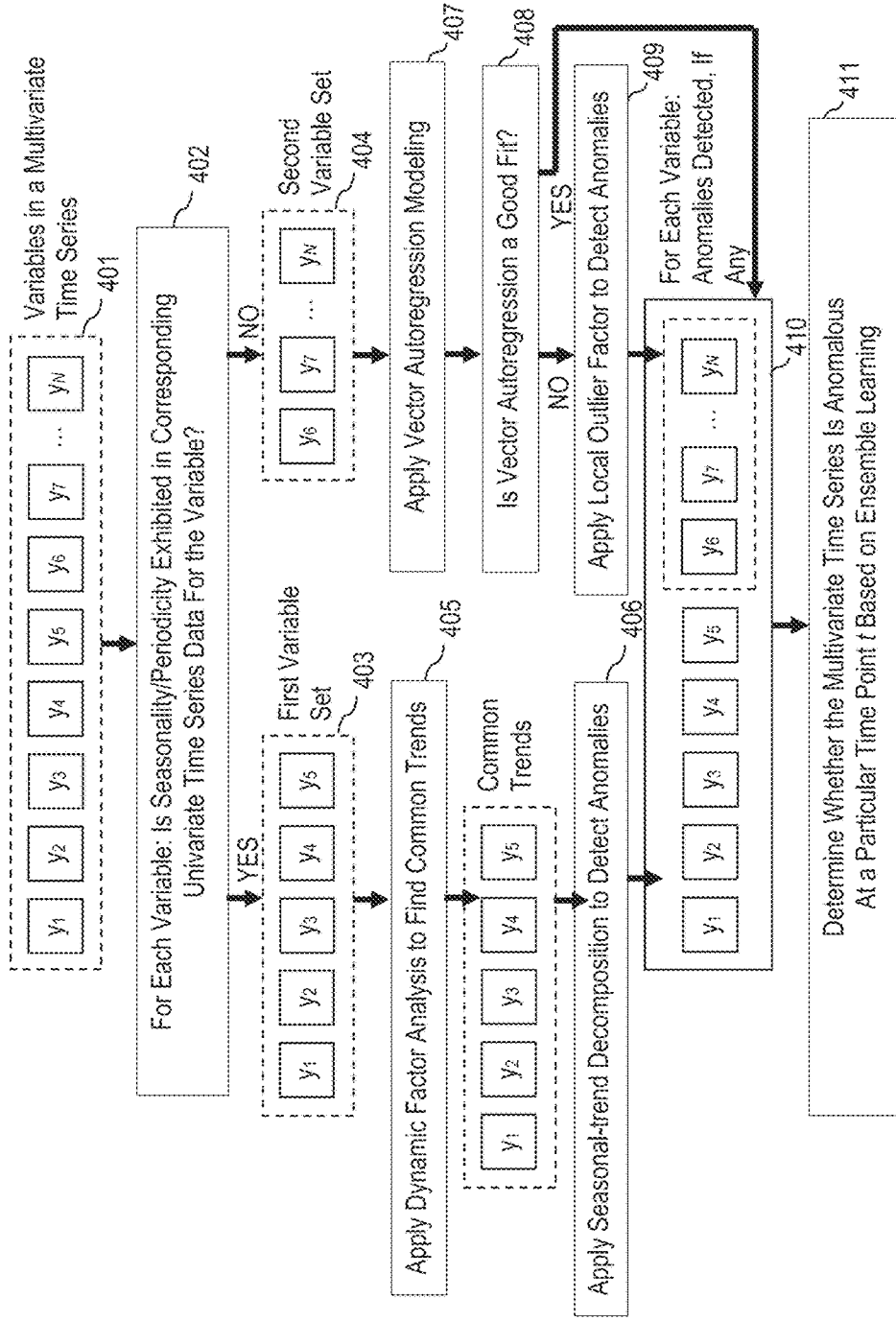
FIG. 3 illustrates an example flowchart for anomaly detection for large scale data protection, in accordance with an embodiment of the invention.

FIG. 3 illustrates an example flowchart 400 for anomaly detection for large scale data protection, in accordance with an embodiment of the invention. In process block 401, receive metadata associated with data backup jobs, wherein the metadata comprises univariate time series data for each variable of a multivariate time series. In process block 402, for each variable of the multivariate time series, determine whether corresponding univariate time series data for the variable exhibits seasonality or periodicity. In process block 403, group each variable that exhibits significant seasonality or periodicity into a first variable set. In process block 404, group each variable that does not exhibit seasonality or periodicity into a second variable set.

In process block 405, apply dynamic factor analysis to find common trends among the first variable set. In process block 406, for each variable of the first variable set, apply seasonal-trend decomposition to detect anomalies for the variable based on the common trends.

In process block 407, apply vector autoregression (VAR) modeling for the second variable set. In process block 408, for each variable of the second variable set, determine whether VAR is a good fit on that variable. If VAR does not fit the multivariate time series well (i.e., based on an average value of all goodness-of-fit values $R^2$ determined for all variables of the second variable set), proceed to process block 409 where a local outlier factor (LOF) is applied to detect anomalies for variables of the second variable set. If VAR fits the multivariate time series well, proceed to process block 410.

In process block 410, for each variable of the multivariate time series, anomalies for the variable are identified, if any. In process block 411, determine whether the multivariate time series is anomalous at a particular time point t based on ensemble learning.

In one embodiment, process blocks 401-411 are performed by at least the anomaly detection system 200.

FIG. 4 illustrates an example metadata record 450 associated with a data backup job, in accordance with an embodiment of the invention. The metadata record 450 comprises univariate time series data for each variable of a multivariate time series. Examples of variables include, but are not limited to, one or more of the following: Byte Count, Error Count, File Count, Job Duration, Objects Inspected, Objects Updated, etc. As shown in FIG. 4, the metadata record 450 includes a set 460 of values for variables Byte Count ("ByteCount"), Error Count ("ErrorCount"), File Count ("FileCount"), and Job Duration ("JobDuration").

Figure 5:
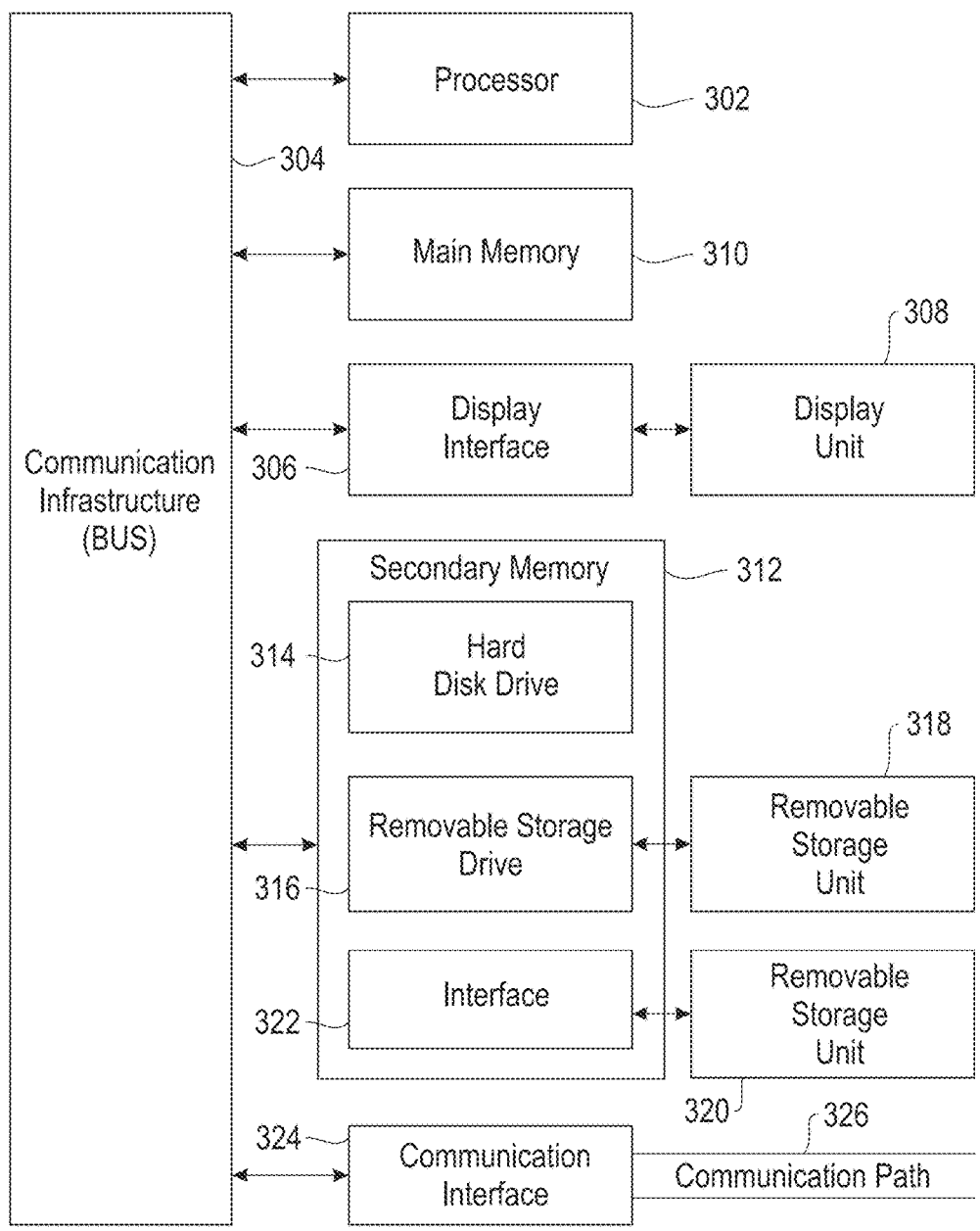
FIG. 5 is a high level block diagram showing an information processing system useful for implementing an embodiment of the present invention.

FIG. 5 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving metadata associated with one or more data backup jobs performed on one of more storage devices, wherein the metadata comprises univariate time series data for each variable of a multivariate time series, and the multivariate time series comprises different variables that exhibit different characteristics over time; and
   decreasing likelihood of a failure in data protection involving the one or more data backup jobs by:
      for each variable of the multivariate time series:
         selecting, from different anomaly detection models with different performance costs, an anomaly detection model suitable for the variable based on one or more characteristics exhibited by corresponding univariate time series data for the variable and covariations and interactions between the variable and at least one other variable of the multivariate time series; and
         detecting an anomaly on the variable utilizing the anomaly detection model selected for the variable; and
      based on each anomaly detection model selected for each variable of the multivariate time series,
   determining whether the multivariate time series is anomalous at a particular time point, and generating data indicative of whether the multivariate time series is anomalous at the particular time point.

2. The method of claim 1, further comprising:
   for each variable of the multivariate time series:
      determining whether corresponding univariate time series data for the variable exhibits seasonality;
      in response to determining the corresponding univariate time series data for the variable exhibits seasonality, grouping the variable into a first variable set; and
   in response to determining the corresponding univariate time series data for the variable does not exhibit seasonality, grouping the variable into a second variable set.

3. The method of claim 2, further comprising:
   for the first variable set:
      applying dynamic factor analysis to identify one or more common trends among the first variable set; and for each variable of the first variable set, detecting an anomaly on the variable using seasonal-trend decomposition and the common trends.

4. The method of claim 2, further comprising:
for the second variable set:
applying vector autoregression (VAR) modeling to all the variables;
for each variable of the second variable set, determining a goodness-of-fit value for the variable based on the VAR modeling; and
determining whether VAR fits the multivariate time series based on an average of each goodness-of-fit value determined for each variable of the second variable set.

5. The method of claim 4, further comprising:
in response to determining VAR fits the multivariate time series, detecting an anomaly on each variable of the second variable set using VAR.

6. The method of claim 4, further comprising:
in response to determining VAR does not fit the multivariate time series, detecting an anomaly on variables of the second variable set using local outlier factor.

7. A system comprising:
at least one processor; and
a non-transitory processor-readable memory device storing instructions that when executed by the at least one processor causes the at least one processor to perform operations including:
receiving metadata associated with one or more data backup jobs performed on one of more storage devices, wherein the metadata comprises univariate time series data for each variable of a multivariate time series, and the multivariate time series comprises different variables that exhibit different characteristics over time; and
decreasing likelihood of a failure in data protection involving the one or more data backup jobs by:
for each variable of the multivariate time series:
selecting, from different anomaly detection models with different performance costs, an anomaly detection model suitable for the variable based on one or more characteristics exhibited by corresponding univariate time series data for the variable and covariations and interactions between the variable and at least one other variable of the multivariate time series; and
detecting an anomaly on the variable utilizing the anomaly detection model selected for the variable; and
based on each anomaly detection model selected for each variable of the multivariate time series, determining whether the multivariate time series is anomalous at a particular time point, and generating data indicative of whether the multivariate time series is anomalous at the particular time point.

8. The system of claim 7, the operations further comprising:
for each variable of the multivariate time series:
determining whether corresponding univariate time series data for the variable exhibits seasonality;
in response to determining the corresponding univariate time series data for the variable exhibits seasonality, grouping the variable into a first variable set; and
in response to determining the corresponding univariate time series data for the variable does not exhibit seasonality, grouping the variable into a second variable set.

9. The system of claim 8, the operations further comprising:
for the first variable set:
applying dynamic factor analysis to identify one or more common trends among the first variable set; and
for each variable of the first variable set, detecting an anomaly on the variable using seasonal-trend decomposition and the common trends.

10. The system of claim 8, the operations further comprising:
for the second variable set:
applying vector autoregression (VAR) modeling to all the variables;
for each variable of the second variable set, determining a goodness-of-fit value for the variable based on the VAR modeling; and
determining whether VAR fits the multivariate time series based on an average of each goodness-of-fit value determined for each variable of the second variable set.

11. The system of claim 10, the operations further comprising:
in response to determining VAR fits the multivariate time series, detecting an anomaly on each variable of the second variable set using VAR.

12. The system of claim 10, the operations further comprising:
in response to determining VAR does not fit the multivariate time series, detecting an anomaly on variables of the second variable set using local outlier factor.

13. A computer program product comprising a computer-readable hardware storage medium having program code embodied therewith, the program code being executable by a computer to implement a method comprising:
receiving metadata associated with one or more data backup jobs performed on one of more storage devices, wherein the metadata comprises univariate time series data for each variable of a multivariate time series, and the multivariate time series comprises different variables that exhibit different characteristics over time; and
decreasing likelihood of a failure in data protection involving the one or more data backup jobs by:
for each variable of the multivariate time series:
selecting, from different anomaly detection models with different performance costs, an anomaly detection model suitable for the variable based on one or more characteristics exhibited by corresponding univariate time series data for the variable and covariations and interactions between the variable and at least one other variable of the multivariate time series; and
detecting an anomaly on the variable utilizing the anomaly detection model selected for the variable; and
based on each anomaly detection model selected for each variable of the multivariate time series, determining whether the multivariate time series is anomalous at a particular time point, and generating data indicative of whether the multivariate time series is anomalous at the particular time point.

14. The computer program product of claim 13, the operations further comprising:
for each variable of the multivariate time series:
determining whether corresponding univariate time series data for the variable exhibits seasonality;
in response to determining the corresponding univariate time series data for the variable exhibits seasonality, grouping the variable into a first variable set; and
in response to determining the corresponding univariate time series data for the variable does not exhibit seasonality, grouping the variable into a second variable set.

15. The computer program product of claim 14, the operations further comprising:
for the first variable set:
applying dynamic factor analysis to identify one or more common trends among the first variable set; and
for each variable of the first variable set, detecting an anomaly on the variable using seasonal-trend decomposition and the common trends.

16. The computer program product of claim 14, the operations further comprising:
for the second variable set:
applying vector autoregression (VAR) modeling to all the variables;
for each variable of the second variable set, determining a goodness-of-fit value for the variable based on the VAR modeling; and
determining whether VAR fits the multivariate time series based on an average of each goodness-of-fit value determined for each variable of the second variable set.

17. The computer program product of claim 16, the operations further comprising:
in response to determining VAR fits the multivariate time series, detecting an anomaly on each variable of the second variable set using VAR.

18. The computer program product of claim 16, the operations further comprising:
in response to determining VAR does not fit the multivariate time series, detecting an anomaly on variables of the second variable set using local outlier factor.

* * * * *